UNITED STATES PATENT OFFICE.

ST. JOHN O'DORIS, OF PHILADELPHIA, PENNSYLVANIA.

IMPROVEMENT IN FERTILIZERS.

Specification forming part of Letters Patent No. 34,039, dated December 24, 1861; Reissue No. 1,261, dated January 28, 1862.

*To all whom it may concern:*

Be it known that I, ST. JOHN O'DORIS, of Philadelphia, in the county of Philadelphia and State of Pennsylvania, have invented a new and useful Improvement in Fertilizing Compounds; and I do hereby declare that the following is a full, clear, and exact description of the same.

The nature of my invention consists in an improved fertilizing compound composed of coal-ashes, animal manure, animal matter, and vegetable matter, the said component parts being prepared and used together in the proportions hereinafter specified.

To make my fertilizing compound proceed as follows: Use of coal-ashes, in bulk, seventy-five parts; animal manure, in bulk, fifteen parts; animal matter, in bulk, five parts; vegetable matter, in bulk, five parts. These several substances are properly prepared and mixed thoroughly in any approved manner, and when in a proper condition are subjected to a grinding process, which reduces the compounded mass to powder, in which state it is used for fertilizing the soil. The animal manure will comprise, principally, such substances as are known as "horse-dung;" also, all others classed as "night-soil," and likewise the urine of all descriptions of animals. The animal matter will comprise dead animals of every description and offal thereof. The vegetable matter will comprise the offal of vegetables contained in slops, such as are thrown from the kitchen or other places into the streets.

It is believed that while the coal-ashes of the compound will not mingle with clay soils nor descend to the subsoil, they will absorb the moisture from the atmosphere, and also the gaseous alkali known as "ammonia," thrown off from the compound of vegetable, animal, and other substance contained in the same, and if so, then a concentration and retention of the essential qualities of the compound around and about the roots of the plants will be effected; but as it may be desirable, owing to the locations and qualities of the different soils, to change the quantity of the above-described fertilizer by an increase or decrease of five per cent. in the parts, which will not essentially change the quality, either in solution or otherwise, as it may be found expedient to pour it on the roots of trees, plants, vines, flowers, shrubs, &c. Therefore I do not limit myself to the exact proportions given above, but can vary them somewhat without changing the nature of the compound.

What I claim, and desire to secure by Letters Patent, is—

The use of coal-ashes as a basis for deodorizing, absorbing, and retaining of animal, vegetable, and mineral matter in solution or otherwise, when united in a fertilizing compound, substantially as herein set forth.

ST. JOHN O'DORIS.

Witnesses:
EDM. F. BROWN,
OCTAVIUS KNIGHT.